United States Patent
Chen et al.

(10) Patent No.: US 9,900,873 B2
(45) Date of Patent: Feb. 20, 2018

(54) METHOD AND DEVICE FOR TRANSMITTING PARAMETERS AND METHOD AND DEVICE FOR GENERATING PARAMETERS

(75) Inventors: Yijian Chen, Shenzhen (CN); Jun Xu, Shenzhen (CN); Yu Ngok Li, Shenzhen (CN); Bo Dai, Shenzhen (CN); Junfeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 528 days.

(21) Appl. No.: 14/418,292

(22) PCT Filed: Dec. 16, 2011

(86) PCT No.: PCT/CN2011/084154
§ 371 (c)(1),
(2), (4) Date: Jan. 29, 2015

(87) PCT Pub. No.: WO2012/151999
PCT Pub. Date: Nov. 15, 2012

(65) Prior Publication Data
US 2015/0208388 A1    Jul. 23, 2015

(30) Foreign Application Priority Data
Aug. 5, 2011 (CN) .......................... 2011 1 0223780

(51) Int. Cl.
*H04W 72/04* (2009.01)
*H04L 27/26* (2006.01)
(Continued)

(52) U.S. Cl.
CPC .......... *H04W 72/042* (2013.01); *H04B 7/024* (2013.01); *H04L 5/0035* (2013.01);
(Continued)

(58) Field of Classification Search
None
See application file for complete search history.

(56) References Cited

U.S. PATENT DOCUMENTS 8,009,552 B2 * 8/2011 Branlund ............ H04W 74/002
370/208
8,442,002 B2 * 5/2013 Zhou ............................ 370/330
(Continued)

FOREIGN PATENT DOCUMENTS

CN    101931485 A    4/2011
CN    102014504 A    4/2011
(Continued)

OTHER PUBLICATIONS

International Search Report for corresponding application PCT/CN2011/084154 filed Dec. 16, 2011; dated May 12, 2012.
(Continued)

*Primary Examiner* — Bunjob Jaroenchonwanit
(74) *Attorney, Agent, or Firm* — Cantor Colburn LLP

(57) ABSTRACT

Disclosed are a method and device for transmitting parameters and a method and device for generating parameters. The method for transmitting parameters comprises: a transmission node determines a first set of parameters for the transmission node to generate at least one user equipment specific reference signal; and the transmission node sends the first set of parameters to one or more transmission nodes adjacent to the transmission node. Through the disclosure, interference between user equipment specific reference signals of transmission nodes is reduced.

10 Claims, 5 Drawing Sheets

(51) Int. Cl.
*H04W 28/18* (2009.01)
*H04B 7/024* (2017.01)
*H04L 5/00* (2006.01)
*H04W 28/20* (2009.01)

(52) U.S. Cl.
CPC ........ *H04L 5/0048* (2013.01); *H04L 27/2613* (2013.01); *H04W 28/18* (2013.01); *H04W 72/0446* (2013.01); *H04L 5/0051* (2013.01); *H04L 5/0091* (2013.01); *H04W 28/20* (2013.01)

(56) References Cited

U.S. PATENT DOCUMENTS

| | | | | |
|---|---|---|---|---|
| 9,144,059 | B2* | 9/2015 | De Bruin | H04W 72/04 |
| 9,185,620 | B2* | 11/2015 | Khoryaev | H04W 24/10 |
| 2007/0002958 | A1* | 1/2007 | Chang | H04L 27/2601 375/260 |
| 2007/0105561 | A1* | 5/2007 | Doetsch | H04W 72/082 455/450 |
| 2008/0159217 | A1* | 7/2008 | Chang | H04W 72/0406 370/329 |
| 2009/0047971 | A1* | 2/2009 | Fu | H04W 72/082 455/450 |
| 2009/0225712 | A1* | 9/2009 | Stamoulis | H04W 72/1247 370/329 |
| 2010/0074209 | A1* | 3/2010 | Montojo | H04W 72/1231 370/329 |
| 2010/0097937 | A1* | 4/2010 | Pietraski | H04L 1/0026 370/241 |
| 2010/0130244 | A1* | 5/2010 | Hong | H04W 72/1231 455/522 |
| 2010/0159936 | A1* | 6/2010 | Brisebois | H04W 72/085 455/450 |
| 2010/0208693 | A1* | 8/2010 | Centonza | H04W 36/0083 370/331 |
| 2010/0211597 | A1* | 8/2010 | Huoviala | H04L 12/5692 707/769 |
| 2010/0246503 | A1* | 9/2010 | Fox | H04W 52/243 370/329 |
| 2010/0248638 | A1* | 9/2010 | Harada | H04J 11/0053 455/67.11 |
| 2010/0273498 | A1* | 10/2010 | Kim, II | H04W 24/02 455/450 |
| 2011/0039569 | A1* | 2/2011 | Narasimha | H04W 52/10 455/452.2 |
| 2011/0103510 | A1 | 5/2011 | Gaal et al. | |
| 2011/0110455 | A1* | 5/2011 | Gaal | H04L 5/14 375/295 |
| 2011/0217985 | A1* | 9/2011 | Gorokhov | H04W 24/10 455/452.2 |
| 2011/0218016 | A1* | 9/2011 | Hirakawa | H04B 7/024 455/524 |
| 2011/0243010 | A1* | 10/2011 | Geirhofer | H04W 52/08 370/252 |
| 2012/0002577 | A1* | 1/2012 | Ishii | H04W 72/082 370/281 |
| 2012/0004009 | A1* | 1/2012 | Lindoff | H04W 52/0232 455/522 |
| 2012/0015664 | A1* | 1/2012 | Han | H04W 72/082 455/452.1 |
| 2012/0044870 | A1* | 2/2012 | Mochizuki | H04B 7/024 370/328 |
| 2012/0082108 | A1* | 4/2012 | Lien | H04W 72/0426 370/329 |
| 2012/0176884 | A1* | 7/2012 | Zhang | H04B 7/024 370/203 |
| 2012/0182859 | A1* | 7/2012 | Ikeda | H04L 1/1835 370/216 |
| 2012/0236731 | A1* | 9/2012 | Beaudin | H04W 72/082 370/248 |
| 2012/0263057 | A1* | 10/2012 | Choi | H04W 28/048 370/252 |
| 2012/0329497 | A1* | 12/2012 | Yamazaki | H04W 52/243 455/501 |
| 2013/0010750 | A1* | 1/2013 | Hoshino | H04W 72/082 370/330 |
| 2013/0012224 | A1* | 1/2013 | Yang | H04W 16/10 455/452.1 |
| 2013/0039195 | A1* | 2/2013 | Weng | H04W 48/20 370/252 |
| 2013/0044685 | A1* | 2/2013 | Fong | H04J 11/0053 370/328 |
| 2013/0084907 | A1* | 4/2013 | Shen | H04W 72/082 455/501 |
| 2013/0102350 | A1* | 4/2013 | Sawai | H04W 52/16 455/517 |
| 2013/0121186 | A1* | 5/2013 | Vajapeyam | H04W 72/085 370/252 |
| 2013/0196603 | A1* | 8/2013 | Gheorghiu | H04W 24/00 455/67.11 |
| 2013/0229934 | A1* | 9/2013 | Brisebois | H04W 72/085 370/252 |
| 2013/0250882 | A1* | 9/2013 | Dinan | H04W 72/0426 370/329 |
| 2013/0279461 | A1* | 10/2013 | De Bruin | H04W 72/04 370/329 |
| 2013/0295976 | A1* | 11/2013 | Patil | H04W 24/10 455/501 |
| 2013/0337823 | A1* | 12/2013 | Tiirola | H04W 16/10 455/452.2 |
| 2014/0023004 | A1* | 1/2014 | Kumar | H04W 72/082 370/329 |
| 2014/0038613 | A1* | 2/2014 | Toskala | H04W 36/20 455/436 |
| 2014/0044108 | A1* | 2/2014 | Earnshaw | G01S 5/0063 370/336 |
| 2014/0198766 | A1* | 7/2014 | Siomina | H04W 72/082 370/330 |
| 2014/0256336 | A1* | 9/2014 | Manssour | H04L 1/0026 455/450 |
| 2014/0293953 | A1* | 10/2014 | Seo | H04W 24/10 370/329 |
| 2014/0295873 | A1* | 10/2014 | Lunden | H04W 52/146 455/454 |
| 2014/0295882 | A1* | 10/2014 | Guo | G01S 5/02 455/456.1 |
| 2014/0315561 | A1* | 10/2014 | Hooli | H04W 16/14 455/450 |
| 2014/0328309 | A1* | 11/2014 | Comstock | H04W 72/082 370/329 |
| 2015/0030006 | A1* | 1/2015 | Fujio | H04B 7/0456 370/336 |
| 2015/0146673 | A1* | 5/2015 | Geirhofer | H04B 7/0626 370/329 |
| 2015/0163794 | A1* | 6/2015 | Liang | H04W 72/042 370/329 |

FOREIGN PATENT DOCUMENTS

| | | |
|---|---|---|
| CN | 102026298 A | 4/2011 |
| CN | 102055519 A | 5/2011 |
| WO | 2011007583 A1 | 1/2011 |
| WO | 2011041544 A2 | 4/2011 |
| WO | 2011072156 A2 | 6/2011 |
| WO | 2011085702 A1 | 7/2011 |

OTHER PUBLICATIONS

English Translation of Abstract of CN101931485A.
English Translation of Abstract of CN102026298A.

* cited by examiner

METHOD AND DEVICE FOR TRANSMITTING PARAMETERS AND METHOD AND DEVICE FOR GENERATING PARAMETERS

TECHNICAL FIELD

The disclosure relates to the field of communications, and in particular to a method and device for transmitting parameters and a method and device for generating parameters.

BACKGROUND

The coordinated multiple input multiple output (MIMO) technology, also called the coordinated multiple point transmission and reception (COMP) technology, uses coordinated transmission of transmit antennas in a plurality of cells to improve the capacity and the transmission reliability of wireless links at the cell edge, which may effectively solve the problem of cell edge interference.

In wireless communications, if a plurality of antennas are used at the sending end (eNB), the method of space multiplexing may be used to improve the transmission rate, that is, different data are transmitted at different antenna positions on the same time-frequency resource of the sending end, and a plurality of antennas are also used at the receiving end (user equipment). In general, the MIMO has two transmission forms, one is single user-MIMO (SU-MIMO), which allocates resources of all the antennas to the same user in the case of a single user; and the other one is multi user-MIMO (MU-MIMO), which allocates resources of different antenna spaces to different users in the case of multiple users and realizes services for a plurality of uses through space division at the same time and on the same carrier, and the average throughput within cells may be improved through the MU-MIMO transmission form.

Specifically, the SU-MIMO refers to that one user equipment occupies physical resources allocated to the user equipment alone in a transmission interval. The MU-MIMO refers to that one user equipment and at least one other user equipment share the physical resources allocated to the user equipment in a transmission interval. The one user equipment and other user equipment share the same physical resource (including a time-frequency resource) by way of space division multiple address or space division multiplexing.

The 3rd generation partnership project (3GPP) R8/R9/R10 and subsequent versions of networks use flat network architectures; as shown in FIG. 1, evolved Node B (eNB) is the main body of a wireless network, and an entire access network is wholly composed of eNBs. The eNBs may have a logical or physical connection there between according to requirements, and the bottom layers of the eNBs use Internet protocol (IP) transmission there between and are logically connected to each other through X2 interface, and such a design is mainly used for supporting the mobility of UE in the entire network and guaranteeing seamless switching of uses; in addition, the X2 interface is also responsible for load and interference management. Each eNB is connected to a system architecture evolution (SAE) core network, that is, an evolved packet core (EPC) network, through S1 interface.

Series standards R8/R9/R10 of long term evolution (LTE) define UE specific reference signals, wherein the specific reference signals are mainly used for transmission modes 7, 8 and 9, and the specific reference signals are only embedded in resources of the UE to which the high speed physical downlink shared channel (PDSCH) is mapped. The UE specific reference signals are used, and these reference signals may perform channel estimation on corresponding PDSCH resource blocks so as to demodulate data. Therefore, the UE specific reference signals are regarded as using independent antenna ports and having special channel response from the eNodeB to the UE. This kind of reference signals carry UE information and may only be sent on a frequency band occupied by the data of the UE; therefore, orthogonal frequency division multiplexing (OFDM) symbols occupied by the control channel does not need to be covered in time domain.

A typical usage of the UE specific reference signals is transmitting the data to specific UE through beamforming. For example, not by using a separate physical antenna to transmit cell reference signal (CRS), the eNodeB may use a correlation matrix of a physical antenna unit to generate narrow beams in a specific UE direction. This kind of beams have specific signal response between the eNodeB and the UE, and UE specific reference signals are needed to be used to perform coherent demodulation on beam data. Actually, channel response carried by the UE specific reference signals may be intuitively interpreted as a channel matrix weighted a precoding weight.

One important aspect for limiting the performance of system throughputs in a cellular network is inter-cell interference especially that of cell edge users. Coordinated multiple point transmission and reception (COMP) may coordinate the scheduling and transmission of different cells, effectively deal with interference from adjacent cells, and significantly increase data rate of the cell edge users. In order to realize the coordinated multiple point transmission and reception (COMP), communications are needed to be performed between adjacent cells. If the adjacent cells are managed by the same eNodeB, then the coordinated multiple point transmission and reception does not need standardized signaling. However, in the adjacent cells controlled by different eNBs, the standardized signaling is very important, especially for a multi-vendor network.

In relevant art, as regards the method of the coordinated multiple point transmission and reception in the R11 standard, according to the conclusion of the R10 standard, channel measurement of a down link may be performed based on a CSI-RS, and data reception and demodulation of a downlink transmission link may be performed based on a UE specific RS. However, in a cooperation set, the UE specific reference signals generated by different eNBs using parameters determined thereby have the problem of mutual interference.

SUMMARY OF THE INVENTION

The main object of the disclosure is to provide a method and device for transmitting parameters and a method and device for generating parameters, so as to solve the above-mentioned problem.

According to one aspect of the disclosure, a method for transmitting parameters is provided and comprises: a transmission node determining a first set of parameters used for the transmission node to generate at least one UE specific reference signal; and the transmission node sending the first set of parameters to one or more transmission nodes adjacent to the transmission node.

Preferably, the first set of parameters comprise at least one of the following: antenna port number, scrambling identity, the number of total layers, cell identity, the maximum downlink bandwidth, frequency index of a physical downlink shared channel (PDSCH) for downlink transmission, and at least one timeslot number in a radio frame for transmitting the at least one UE specific reference signal.

Preferably, a transmission node sends the first set of parameters to the one or more transmission nodes adjacent to the transmission node through X2 interface.

Preferably, the transmission node, through at least one information element (IE) item which is set on a LOAD INFORMATION message of the X2 interface, sends the first set of parameters to the one or more transmission nodes adjacent to the transmission node.

Preferably, the transmission node comprise one of the following: an evolved Node B (eNodeB), a macro cell, a relay station, a pico cell, a femtocell, a home eNodeB, a remote radio head (RRH), a radio remote unit (RRU) and a distributed antenna unit.

According to another aspect of the disclosure, a method for generating parameters is also provided and comprises: a transmission node receives a first set of parameters which are used for one or more transmission nodes to generate UE specific reference signals and are sent by the one or more transmission nodes adjacent to the transmission node; the transmission node selects a second set of parameters for generating at least one UE specific reference signal corresponding to a second transmission node according to the first set of parameters; and the transmission node uses the second set of parameters to generate the UE specific reference signals corresponding to the second transmission node.

Preferably, a value corresponding to at least one of the second set of parameters is different from values corresponding to the first set of parameters.

Preferably, the first set of parameters and the second set of parameters comprise at least one of the following: at least one antenna port number, scrambling identity, the number of total layers, cell identity, the maximum downlink bandwidth, frequency index of a physical downlink shared channel (PDSCH) for downlink transmission, and at least one timeslot number in a radio frame for transmitting the UE specific reference signals.

According to another aspect of the disclosure, a device for transmitting parameters is further provided, which is applied to the transmission nodes and comprises: a determination component configured to determine parameters for a transmission node, where the determination component is located, to generate at least one UE specific reference signal; and a sending component configured to send the parameters to one or more transmission nodes adjacent to the transmission node.

The transmission nodes comprise one of the following: an evolved Node B (eNodeB), a macro cell, a relay station, a pico cell, a femtocell, a home eNodeB, a remote radio head (RRH), a remote radio unit (RRU) and a distributed antenna unit.

According to another aspect of the disclosure, a device for generating parameters is further provided, which is applied to a transmission node and comprises: a reception component configured to receive a first set of parameters which are used for one or more transmission nodes to generate UE specific reference signals and are sent by the one or more transmission nodes adjacent to the transmission node; a selection component configured to select a second set of parameters for generating at least one UE specific reference signal corresponding to the transmission node where the selection component located according to the first set of parameters; and a generation component configured to use the second set of parameters to generate the at least one UE specific reference signals corresponding to the transmission node where the generation component located.

In the disclosure, the transmission node determines a first set parameters for the transmission node to generate at least one UE specific reference signal; the transmission node sends the first set of parameters to one or more transmission nodes adjacent to the transmission node. By means of the above solution, the problem that, in a cooperation set, the UE specific reference signals generated by different transmission nodes using parameters determined thereby have the mutual interference is solved, thereby achieving the effect of reducing the interference between the UE specific reference signals of the transmission node.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF EMBODIMENTS

The preferred embodiments are described in conjunction with the drawings as follows. It should be noted that the embodiments and the features of the embodiments can be combined with each other if there is no conflict.

Figure 1:
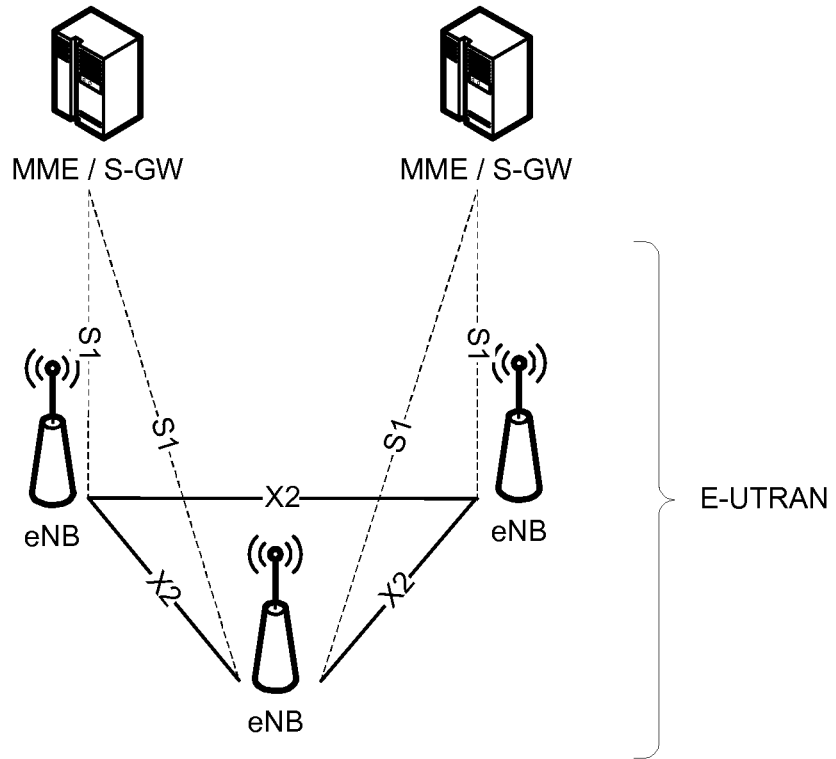
FIG. 1 is a schematic diagram of a network architecture of an LTE and a subsequent evolution standard according to the related art.
Figure 2:
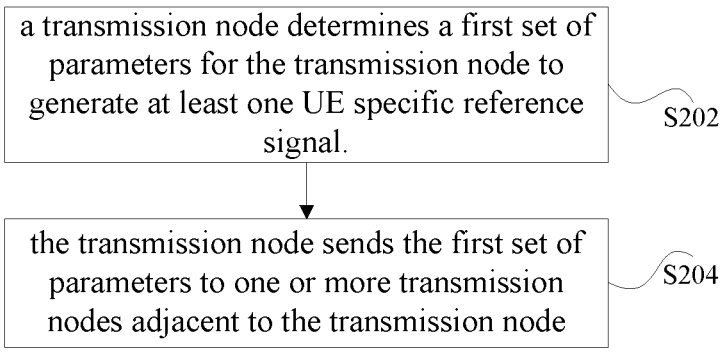
FIG. 2 is a flowchart of a method for transmitting parameters according to an embodiment of the disclosure.

A present embodiment provides a method for transmitting parameters; FIG. 2 is a flowchart of a method for transmitting parameters according to an embodiment of the disclosure, the method comprises the following steps S202 and S204.

Step S202: a transmission node determines a first set of parameters for the transmission node to generate at least one UE specific reference signal.

Step S204: the transmission node sends the first set of parameters to one or more transmission nodes adjacent to the transmission node.

By means of the above-mentioned steps, the transmission node sends the parameters for generating the at least one UE specific reference signal thereby to the one or more transmission nodes adjacent thereto, so as to enable the one or more transmission nodes adjacent thereto to learn the parameters which is used for the transmission node to generate the at least one UE specific reference signal, thereby avoiding using the same parameters to generate the same UE specific reference signal. The problem that, in a cooperation set, the UE specific reference signals generated by different transmission nodes using parameters determined thereby have the mutual interference is solved, thereby achieving the effect of reducing the interference between the UE specific reference signals of the transmission nodes.

Preferably, the first set of parameters comprise at least one of the following: antenna port number, scrambling identity, the number of total layers, cell identity, the maximum downlink bandwidth, frequency index of a Physical Downlink Shared Channel (PDSCH) for downlink transmission, and at least one timeslot number in a radio frame for transmitting the UE specific reference signal.

Figure 7:
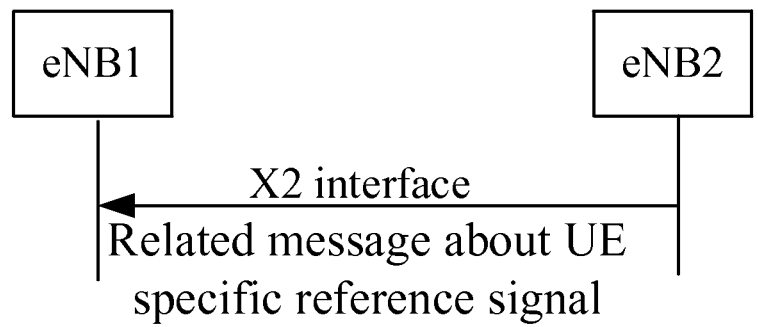
FIG. 7 is a schematic diagram showing message interaction according to an embodiment of the disclosure.

In a preferred implementation, the transmission node sends the first set of parameters to the one or more transmission nodes adjacent to the transmission node through X2 interface. FIG. 7 is a schematic diagram showing message interaction according to an embodiment of the disclosure; as shown in FIG. 7, related messages about the UE specific reference signals are transmitted between eNB 1 and eNB 2 through the X2 interface. The preferred implementation achieves a uniform definition of interfaces of the transmission nodes and improves the efficiency of system transmission. Preferably, the transmission node, through at least one information element (IE) which is set on the LOAD INFORMATION message sending through the X2 interface, sends the first set of parameters to the one or more transmission nodes adjacent to the transmission node. By using the existing signaling to transmit the parameters, signaling transmission loads are reduced.

In the implementations, the transmission node comprises one of the following: an evolved Node B (eNodeB), a macro cell, a relay station, a pico cell, a femtocell, a home eNodeB, a remote radio head (RRH), a remote radio unit (RRU) and a distributed antenna unit. In an actual coordinated multiple point transmission and reception system, multiple kinds of network elements, for example, the Node B and the micro cell, the NodeB and the pico cell, and the relay station and the RRU, may perform coordinated transmission, which improves the coverage area of a coordinated cell, and improves the throughput and performance of the coordinated transmission.

Figure 3:
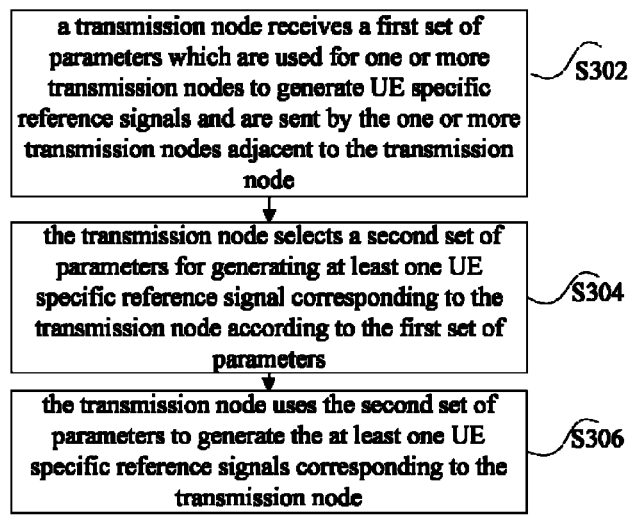
FIG. 3 is a flowchart of a method for generating parameters according to an embodiment of the disclosure.

A present embodiment provides a method for generating parameters; FIG. 3 is a flowchart of a method for generating parameters according to an embodiment of the disclosure, and as shown in FIG. 3, the method comprises the following steps S302 to S306.

Step S302: a transmission node in a coordinated multiple point transmission and reception system receives a first set of parameters which are used for one or more transmission nodes to generate UE specific reference signals and are sent by the one or more transmission nodes adjacent to the transmission node;

step S304: the transmission node selects a second set of parameters for generating at least one UE specific reference signal corresponding to the transmission node according to the first set of parameters; and step S306: the transmission node uses the second set of parameters to generate the at least one UE specific reference signals corresponding to the transmission node.

By means of the above-mentioned steps, the transmission node receives parameters which are from the one or more transmission nodes adjacent to the transmission node and are used for generating the UE specific reference signals, and then uses the received parameters to generate the parameters which is used for generating the at least one UE specific reference signal and corresponds to the transmission node so that the different UE specific reference signals are generated using the same parameters when the UE specific reference signals of different transmission nodes occupy the same time-frequency resource, or the UE specific reference signals of different transmission nodes may occupy different time-frequency resources. The problem that, in a cooperation set, the UE specific reference signals generated by different transmission nodes using parameters determined thereby have the mutual interference is solved, thereby achieving the effect of reducing the interference between the UE specific reference signals of the transmission nodes.

Preferably, the parameters comprise at least one of the following: antenna port number, scrambling identity, the number of total layers, cell identity, the maximum downlink bandwidth, frequency index of a PDSCH for downlink transmission, and at least one timeslot number in a radio frame for transmitting the UE specific reference signals.

In a preferred implementation, a value corresponding to at least one of the second set of parameters is different from values corresponding to the first set of parameters. By means of the method, a UE specific reference signal generated by using the second set of parameters and a UE specific reference signals generated by using the first set of parameters may be different, such that, two adjacent transmission nodes using different UE specific reference signal to perform data reception and demodulation on a downlink transmission link may be achieved, and interference caused by the adjacent transmission nodes using the same UE specific reference signals is avoided. Preferably, the value corresponding to the at least one thereof makes the UE specific reference signals respectively generated by the first set of parameters and the second set of parameters orthogonal, for example, antenna port number in the parameters is different, and other parameters are all the same.

In another embodiment, parameter transmission software is further provided, and the software is used for executing the technical solution described in the above-mentioned embodiment and the preferred embodiment.

In another embodiment, a storage medium is further provided; the storage medium stores the above-mentioned parameter transmission software, and the storage medium includes but not limited to: a light disk, a floppy disk, a hard disk, an erasable memory, etc.

An embodiment of the disclosure also provides a device for transmitting parameters, and the device for transmitting parameters may be used to realize the above-mentioned method for transmitting parameters and the preferred implementations, what have been described in detail will not be further described, the components involved in the device for transmitting parameters will be described below. As used below, the term "entity" may realize the combination of software and/or hardware with predetermined functions. Although the system and method described in the following embodiments may be better realized through software, the realization of hardware or a combination of the software and the hardware is also possible and is conceived.

Figure 4:
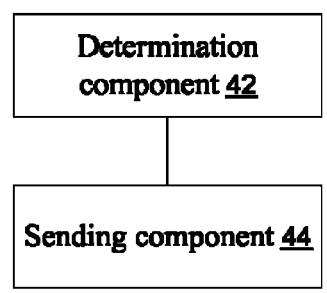
FIG. 4 is a structural block diagram of a device for transmitting parameters according to an embodiment of the disclosure.

FIG. 4 is a structural block diagram of a device for transmitting parameters according to an embodiment of the disclosure; as shown in FIG. 4, the device comprises: a determination component 42 and a sending component 44, the structure is described below in detail.

The determination component 42 is configured to determine a first set of parameters for a transmission node, where the determination component 42 is located, to generate at least one UE specific reference signal; and the sending component 44 is connected to the determination component 42 and is configured to send the first set of parameters determined by the determination component 42 to one or more transmission nodes adjacent to the transmission node.

Preferably, the transmission node comprise one of the following: an evolved Node B (eNodeB), a macro cell, a relay station, a pico cell, a femtocell, a home eNodeB, a remote radio head (RRH), a remote radio unit (RRU) and a distributed antenna unit.

In another embodiment, parameter generation software is further provided, and the software is used for executing the technical solution described in the above-mentioned embodiment and the preferred embodiment.

In another embodiment, a storage medium is further provided; the storage medium stores the above-mentioned parameter generation software, and the storage medium includes but not limited to: a light disk, a floppy disk, a hard disk, an erasable memory, etc.

An embodiment of the disclosure also provides a device for generating parameters, and the device for generating parameters may be used to realize the above-mentioned method for generating parameters and the preferred implementations, what have been described in detail will not be further described, the components involved in the device for generating parameters will be described below. As used below, the term "entity" may realize the combination of software and/or hardware with predetermined functions. Although the system and method described in the following embodiments may be better realized through software, the realization of hardware or a combination of the software and the hardware is also possible and is conceived.

Figure 5:
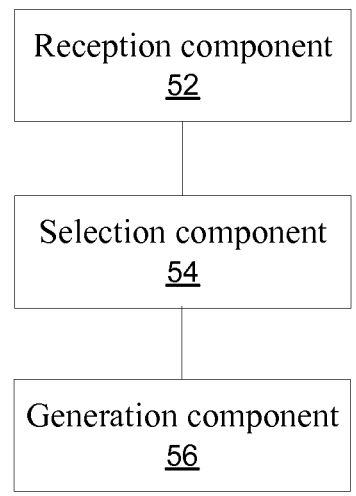
FIG. 5 is a structural block diagram of device for generating parameters according to an embodiment of the disclosure.

FIG. 5 is a structural block diagram of a device for generating parameters according to an embodiment of the disclosure; as shown in FIG. 5, the device comprises: a reception component 52, a selection component 54 and a generation component 56, the above-mentioned structure is described below in detail.

The reception component 52 is configured to receive a first set of parameters which are used for one or more transmission nodes to generate UE specific reference signals and are sent by the one or more transmission nodes adjacent to the transmission node; the selection component 54 is connected to the reception component 52 and is configured to select a second set of parameters for generating at least one UE specific reference signal corresponding to the transmission node where the selection component 54 is located according to the first set of parameters received by the reception component 52; and the generation component 56 is connected to the selection component 54 and is configured to use the second set of parameters selected by the selection component 54 to generate the at least one UE specific reference signal corresponding to the transmission node where the generation component 56 located.

Description will be performed below in combination with the preferred embodiments, and the following preferred embodiments combine with the above-mentioned embodiments and the preferred implementations.

Preferred Embodiment I

The present embodiment provides a method for interacting information between a plurality of eNBs, and the method includes the following steps S2 to S6.

Step S2: in a coordinated multiple point transmission and reception system, one transmission node sends a related message about UE specific reference signal to one or more adjacent transmission nodes, wherein the related message about the UE specific reference signal comprises at least one of the following information: antenna port number, scrambling identity (ID), the number of total layers, cell identity (ID) $N_{ID}^{cell}$, the maximum downlink bandwidth $N_{RB}^{max,DL}$, frequency index of a downlink transmitted PDSCH, and at least one timeslot number $n_s$ in one radio frame.

During implementation, the related message about the UE specific reference signals comprises one of the following manners or any combination thereof:

Manner 1: the cell identity $N_{ID}^{cell}$ and the maximum downlink bandwidth $N_{RB}^{max,DL}$.

Manner 2: the at least one timeslot number $n_s$ in one radio frame.

Manner 3: the frequency index and subframe number of the PDSCH.

Manner 4: the related message about the UE specific reference signals comprises the antenna port number and the scrambling identity (ID), and the number of total layers of related NodeBs.

In a preferred implementation, the transmission node sends the related message about the UE specific reference signals to the adjacent transmission nodes through X2 interface. Preferably, the transmission node, through at least one IE (indication IE of the related parameters of UE specific Reference Signal) set on a LOAD INFORMATION message sending through the X2 interface, sends related parameters of the UE specific Reference Signal of the present transmission node to adjacent transmission nodes (coordinated cells) corresponding to the present transmission node, wherein the related parameters of the UE specific Reference Signal is used for indicating the usage condition of the UE specific Reference Signal of the present transmission node, such as the information about a generated series, resource position, port number and scrambling identity.

In a preferred implementation, a transmission node may send a related message about the UE specific reference signals to the adjacent transmission nodes through transmission media, such as an optical fibre, a microwave and a cable.

In a preferred implementation, with respect to the transmission node and the adjacent transmission nodes, the related message about the UE specific Reference Signal may be exchanged between the transmission nodes through the X2 interface.

Step S4: the transmission node, which receives the message, schedules UE according to the above-mentioned related message about the UE specific reference signals.

Step S6: the transmission node performs coordinated multi-point transmission after scheduling the UE.

Preferably, the downlink coordinated multi-point transmission in step S6 refers to coordinate scheduling-coordinated beamforming (CS-CB), dynamic cell switching (DCS) or joint transmission (JT) of a plurality of transmission nodes.

Preferably, the transmission node may be one of the following: an eNodeB, or a macro cell, or a relay station, or a pico cell, or a femtocell, or a home eNodeB, or a remote radio head (RRH), or a remote radio unit (RRU), or a distributed antenna unit.

Preferably, the transmission node corresponds to a set of antenna ports uniquely.

Preferably, the transmission node has a single or a plurality of physical antennas.

By means of the above-mentioned steps, the present embodiment determines, for one of a plurality of coordinated eNBs, the content of the related message about the UE specific Reference Signal, and the message is sent to a coordinated sending node, so that the problem that the current UE specific Reference Signal is not suitable for the coordinated multi-point transmission is solved, thereby making the coordinated multi-point downlink transmission possible and providing the throughput and performance of a mobile communication system.

Preferred Embodiment II

Figure 6:
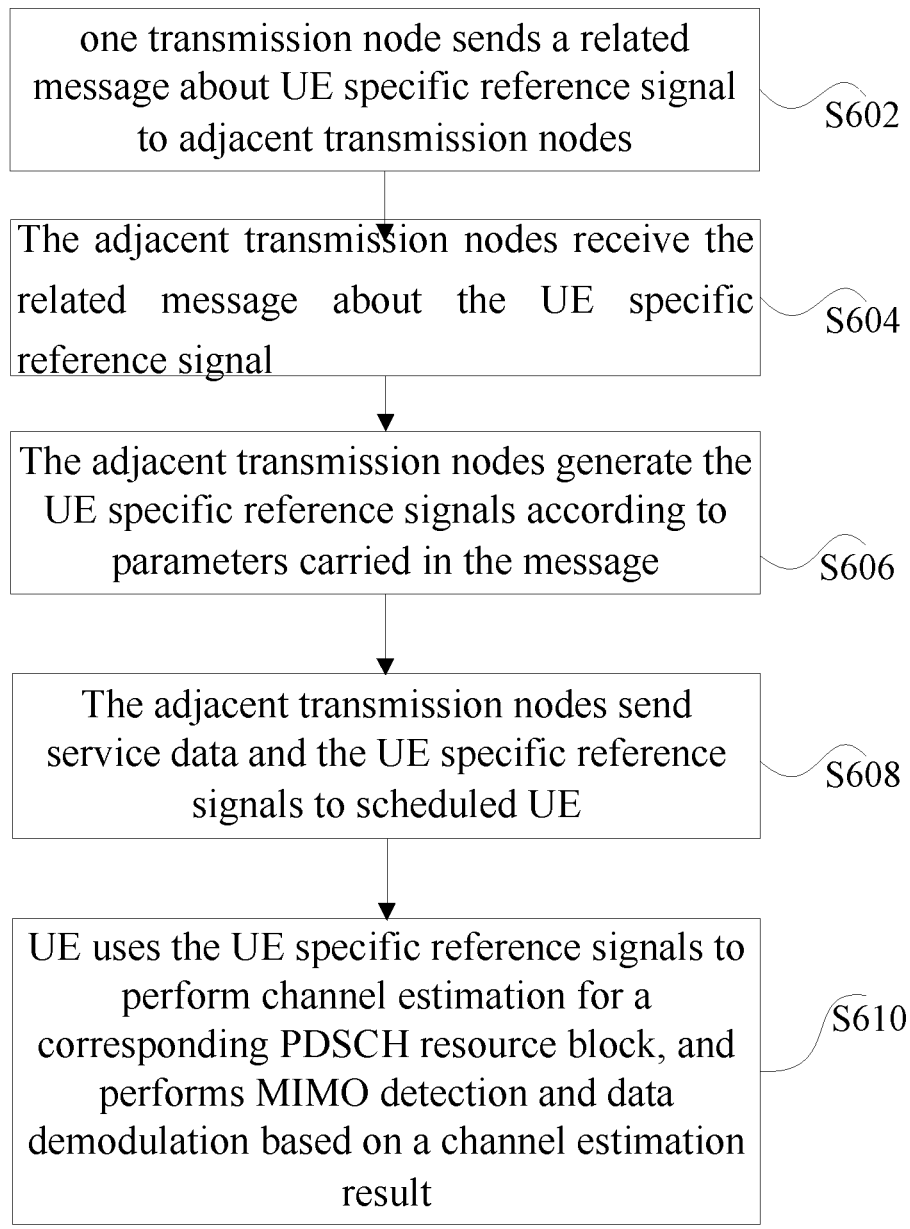
FIG. 6 is a flowchart of a method for interacting messages between two eNBs according to an embodiment of the disclosure.

A present embodiment provides a method for interacting method for a related message about UE specific reference signal between a plurality of eNBs. In the present embodiment, at least one UE specific reference signal is generated based on parameters carried in the message in the method for interacting the related message, and then the at least one UE specific reference signal is used to demodulate downlink data. The method of the present embodiment may guarantee the orthogonality of the UE specific reference signals between the plurality of eNBs. FIG. 6 is a flowchart of a method for interacting message between two eNBs according to an embodiment of the disclosure; as shown in FIG. 6, the method comprises the following steps S602 to S610.

Step S602, one transmission node sends a related message about UE specific reference signal to one or more adjacent transmission nodes. Preferably, the related message about the UE specific reference signal in the step comprises at least one of the following information: antenna port number, scrambling identity (ID), the number of total layers, cell identity (ID) $N_{ID}^{cell}$, the maximum downlink bandwidth $N_{RB}^{max,DL}$, frequency index of a PDSCH for downlink transmission, and at least one timeslot number $n_s$ in one radio frame.

During the implementation, the related message about the UE specific reference signal may use one of the following manners or any combination thereof:

Manner 1: the related message about UE specific reference signal comprises the cell identity (ID) $N_{ID}^{cell}$ and the maximum downlink bandwidth $N_{RB}^{max,DL}$.

Manner 2: the related message about UE specific reference signal comprises at least one timeslot number $n_s$ in one radio frame.

Manner 3: the related message about UE specific reference signal comprises a frequency index and subframe number of the PDSCH.

Manner 4: the related message about UE specific reference signal comprises an antenna port number, a scrambling identity (ID), and the number of total layers of a NodeB.

Preferably, the transmission node is an eNodeB, or a macro cell, or a relay station, or a pico cell, or a femtocell, or a home eNodeB, or a remote radio head (RRH), or a remote radio unit (RRU), or a distributed antenna unit.

Preferably, a transmission node sends the related message about the UE specific reference signal to the adjacent transmission nodes through X2 interface. More particularly, the transmission node, through at least one IE item (indication IE carrying the related parameters of the UE specific Reference Signal) set on a LOAD INFORMATION message sending through the X2 interface, sends related parameters of the UE specific Reference Signal of the present transmission node to adjacent transmission nodes (coordinated cells) corresponding to the present transmission, which is used to indicate the usage condition of the UE specific Reference Signal of the present transmission node, such as the information about a generated series, resource position, port number and scrambling identity.

Preferably, the transmission node sends the related message about the UE specific reference signal to the adjacent transmission nodes through transmission media, such as an optical fibre, a microwave and a cable.

Preferably, with respect to the transmission node and the adjacent transmission nodes, the related message of the UE specific Reference Signal may be exchanged between the transmission nodes through the X2 interface.

Preferably, the transmission node corresponds to a set of antenna ports uniquely.

Preferably, the transmission node has a single or a plurality of physical antennas.

Step S604: the adjacent transmission nodes receive the related message about the UE specific reference signal.

Step S606: one or more transmission nodes among the transmission nodes which receive the related message generate UE specific reference signals according to the related message about the UE specific reference signal.

Preferably, step S506 may use one of the following manners to generate at least one UE specific reference signal.

Manner 1: the transmission node may use different port number and other same parameters in the message to generate the at least one UE specific reference signal.

Manner 2: the transmission node may use different scrambling identity and other same parameters in the message to generate the at least one UE specific reference signal.

Manner 3: the transmission node may use parameters with different timeslot in the message to generate the at least one UE specific reference signal, so as to make UE specific reference signals of different transmission nodes in different timeslots.

Manner 4: the transmission node may use parameters with different frequency resources in the message to generate the at least one UE specific reference signal, so as to make UE specific reference signals of different transmission nodes in different frequency resources.

Step S608: one or more transmission nodes among the transmission nodes, which receive the message, send service data to scheduled user equipment (UE) over the physical downlink data shared channel (PDSCH), at the same time, the UE specific reference signals are embedded in at least one resource block mapped by the PDSCH and sent to UE.

Step S610: the UE performs channel estimation for at least one corresponding PDSCH resource block by using the UE specific reference signals, and performs MIMO detection and data demodulation based on a channel estimation result.

Preferably, the downlink coordinated multi-point transmission refers to coordinate scheduling-coordinated beam-forming (CS-CB), dynamic cell switching (DCS) or joint transmission (JT) of a plurality of transmission nodes.

It needs to note that message content interacted between the eNBs in the prior art is mainly suitable for single cell MIMO transmission, for a missing support of the coordinated multiple point transmission and reception (COMP), it would be caused that downlink demodulation operation may not be performed. By means of the above-mentioned steps of the present embodiment, a format which is used for message interaction between eNBs supporting the COMP is provided; a certain eNodeB may determine the usage condition of UE specific reference signal of the adjacent eNodeB according to the related message about UE specific Reference Signal of the adjacent eNodeB, and further select suitable parameters about UE specific reference signal, and finally realize that, in a cooperation set, all the UE specific reference signals of different eNBs are orthogonal therebetween, thereby avoiding the interference between the UE specific reference signals. Therefore, the accuracy of channel prediction is effectively guaranteed, and then the problem of data demodulation of the coordinated multiple point transmission and reception (COMP) is well solved.

Preferred Embodiment III

A present embodiment provides a method for interacting a related message about UE specific reference signal between a plurality of eNBs, and the method includes the following steps S702 to S710.

Step S702, one transmission node eNodeB 1 sends a related message about UE specific reference signal to another adjacent transmission node eNodeB 2 through X2 interface.

Particularly, the related message about the UE specific reference signal may be bore in a load information message, wherein the related message about the UE specific reference signal comprises: a cell identity (ID) $N_{ID}^{cell}$ of eNodeB 1, the maximum downlink bandwidth $N_{RB}^{max,DL}$ supported by eNodeB 1, antenna port number 7, scrambling identity n_SCID=0, the number of total layers v=2, a frequency domain index $n_{PRB}$ and timeslot number $n_s$ in one wireless frame.

More particularly, the transmission node, through an IE item (indication IE of the related parameter of the UE specific RS) set on the LOAD INFORMATION message of the X2 interface, sends related parameters of the UE specific RS of the present transmission node to adjacent transmission nodes (coordinated cells) corresponding thereto, which is used to indicate the use condition of the UE specific RS of the present transmission node, such as the information about a generated series, resource position, port number and scrambling identity.

Step S704: the adjacent transmission node eNodeB 2 receives the related message of the UE specific reference signals.

Step S706: one received transmission node eNodeB 2 generate the UE specific reference signals according to parameters of the related message of the UE specific reference signals.

Particularly, first, a reference signal sequence is generated according to parameters, such as the scrambling identity n_SCID=0, the maximum downlink bandwidth $N_{RB}^{max,DL}$ supported by eNodeB 1, the cell identity (ID) $N_{ID}^{cell}$ of eNodeB 1 and the timeslot number $n_s$ in one wireless frame, in the related message of the UE specific reference signals. Particularly, for a port p∈{7, 8, . . . , υ+6}, a generation method of the reference signal sequence r(m) is defined as:

$$r(m) = \frac{1}{\sqrt{2}}(1 - 2 \cdot c(2m)) + j\frac{1}{\sqrt{2}}(1 - 2 \cdot c(2m+1)).$$

$$m = 0, 1, \ldots, 12N_{RB}^{max,DL} - 1.$$

It needs to note that a pseudo random sequence c(i) is generated by a pseudo random sequence generator, and an initialization value of the pseudo random sequence generator is initialized as $c_{init}=(\lfloor n_s/2 \rfloor+1) \cdot (2N_{ID}^{cell}+1) \cdot 2^{16}+n_{SCID}$ at the beginning of each subframe; if the PDSCH is transmitted at the port 7 or 8, UE may set the value of $n_{SCID}$ as 0.

After the above-mentioned steps, when being allocated on a PRB with the frequency index $n_{PRB}$ for PDSCH transmission, on the basis of the frequency index $n_{PRB}$ and the number of total layers v=2 in the related message of the reference signals, and an antenna port (such as port 8) which is different from the antenna port number 7 in the related message of the reference signals, according to a method defined in LTE-A standard, that is, R10 standard, mapping a part of the reference signal sequence to a specific resource element of one subframe is realized.

Step S708: transmission node eNodeB 2 in the received transmission nodes send service data to scheduled user equipment through the physical downlink data shared channel (PDSCH), at the same time, the UE specific reference signals are embedded in a resource block mapped by the PDSCH and sent to UE.

Step S710: a user terminal performs channel estimation on a corresponding PDSCH resource block by using the UE specific reference signals, and performs MIMO detection and data demodulation based on a channel estimation result.

It needs to note that eNodeB 1 uses the parameters of the related message about the UE specific reference signal to generate at least one UE specific reference signal for the demodulation of the downlink data of eNodeB 1. Compared with the parameters for eNodeB 1 to generate the at least one UE specific signal, eNodeB 2 uses parameters with the same antenna port but different other parameters to generate at least one UE specific reference signal. Since eNodeB 1 uses the port 7 but eNodeB 2 uses the port 8, the at least one UE specific signal generated by eNodeB 1 and the at least one UE specific signal generated by eNodeB 2 keep the orthogonality and will not occur mutual interference. Finally, the orthogonality of the reference signals of different cells supports the coordinated multiple point transmission and reception or distributed multiple antenna system well, which effectively restrains cell interference and improves system edge throughput.

Preferably, three parameters, the antenna port number, the scrambling identity and the number of total layers, may perform joint encoding, that is, using an index to identify the values of the current three parameters.

Preferred Embodiment IV

The present embodiment provides a method for interacting a related message about UE specific reference signal between a plurality of eNBs, and the method includes the following steps S802 to S810.

Step S802: one transmission node eNodeB 1 sends a related message about UE specific reference signal to another adjacent transmission node eNodeB 2 through X2 interface. In a prefer embodiment, the related message about UE specific reference signal is set in a load information message, wherein the related message cell about the UE specific reference signal comprises: a cell identity (ID) $N_{ID}^{cell}$ of eNodeB 1, the maximum downlink bandwidth $N_{RB}^{max,DL}$ supported by eNodeB 1, antenna port number port 7 and port 8, scrambling identity n_SCID=0, the number of total layers v=2, a frequency domain index $n_{PRB}$ and at least one timeslot number $n_s$ in one radio frame.

Preferably, the transmission node, through at least one IE item (indication IE of the related parameters of the UE specific Reference Signal) set on the LOAD INFORMATION message sending through the X2 interface, sends related parameters of the UE specific Reference Signal of the present transmission node to adjacent transmission nodes (coordinated cells) corresponding thereto, wherein the related parameters of the UE specific Reference Signal is used to indicate the usage condition of the UE specific Reference Signal of the present transmission node, such as the information about a generated series, resource position, port number and scrambling identity.

Step S804: the adjacent transmission node eNodeB 2 receives the related message about the UE specific reference signal.

Step S806: one transmission node eNodeB 2, which receives the related message, generate at least one UE specific reference signal according to parameters carried in the related message about the UE specific reference signal.

Particularly, first, a reference signal sequence is generated according to parameters, such as a scrambling identity n_SCID=0, the maximum downlink bandwidth $N_{RB}^{max,DL}$ supported by eNodeB 1, a cell identity (ID) $N_{ID}^{cell}$ of eNodeB 1 and at least one timeslot number $n_s$ in one radio frame, carried in the related message about the UE specific reference signal. Particularly, for a port p∈{7, 8, . . . , υ+6}, a method for generating the reference signal sequence r(m) is defined as:

$$r(m) = \frac{1}{\sqrt{2}}(1 - 2 \cdot c(2m)) + j\frac{1}{\sqrt{2}}(1 - 2 \cdot c(2m + 1)).$$

$$m = 0, 1, \ldots, 12N_{RB}^{max,DL} - 1.$$

It needs to note that a pseudo random sequence c(i) is generated by a pseudo random sequence generator, and an initialization value of the pseudo random sequence generator is initialized as $c_{init}=(\lfloor n_s/2 \rfloor+1) \cdot (2N_{ID}^{cell}+1) \cdot 2^{16}+n_{SCID}$ at the beginning of each subframe. At this time, the PDSCH is transmitted at ports 7 and 8, and UE needs to set the value of $n_{SCID}$ as 1, that is, the value must be different from the value of n_SCID carried in the related message about the reference signal, such that, it may be guaranteed that the UE specific reference signals of different cells keep the orthogonality.

Then, when a PRB with the frequency index $n_{PRB}$ is allocated for PDSCH transmission, according to a method defined in LTE-A standard, that is, R10 standard, a part of the reference signal sequence is mapped to a specific resource element of one subframe based on the basis of the same frequency index $n_{PRB}$, the number of total layers v=2 and antenna port numbers 7 and 8 carried in the related message about the reference signals.

Step S808: transmission node eNodeB 2, which receives the related message, sends service data to a scheduled UE through the PDSCH, at the same time, the UE specific reference signals are embedded in at least one resource block mapped by the PDSCH and sent to the UE.

Step S810: the UE performs channel estimation for at least one corresponding PDSCH resource block by using the UE specific reference signal, and performs MIMO detection and data demodulation based on a channel estimation result.

It needs to note that eNodeB 1 uses the parameters carried in the related message about the UE specific reference signal to generate at least one UE specific reference signal for the demodulation of the downlink data of eNodeB 1. Compared with the parameters for eNodeB 1 to generate the at least one UE specific signals, eNodeB 2 uses parameters with the same n_SCID but different other parameters to generate at least one UE specific reference signal. Although eNodeB 1 and eNodeB 2 use the same ports (port 7 and port 8) at the same time, since eNodeB 1 uses the scrambling identity n_SCID with the value being 0, and eNodeB 2 uses the scrambling identity n_SCID with the value being 1, the at least one UE specific signal generated by eNodeB 1 and the at least one UE specific signal used by eNodeB 2 keep the certain orthogonality and will not occur mutual interference. Finally, the orthogonality of the reference signals of different cells supports the coordinated multiple point transmission and reception or distributed multiple antenna system well, which effectively restrains cell interference and improves system edge throughput.

Preferably, three parameters, the antenna port number, the scrambling identity and the number of total layers, may perform joint encoding, that is, an index is used for identifying the values of the current three parameters.

To sum up, by means of the technical solution provided by the embodiments of the disclosure, an eNodeB sends a related message about UE specific reference signal to an adjacent eNodeB; the adjacent eNodeB may determine the usage condition of the UE specific reference signal of the eNodeB according to the related message about UE specific Reference Signal, and then select suitable parameters about UE specific reference signal; finally, it is realized that all the UE specific reference signals of different eNBs in a coordinated set or UE specific reference signals of different eNBs occupies different time-frequency resources. The above solution avoids the interference between the UE specific reference signals, and thus effectively guarantees the accuracy of channel prediction, and solves the problem of data demodulation of coordinated multiple point transmission and reception (COMP) well. It needs to note that these technical effects are not owned by all the above-mentioned implementations, and some technical effects may only be obtained by certain preferred implementations.

Obviously, those skilled in the art shall understand that the above-mentioned components and steps of the disclosure may be realized by using general purpose calculating device, may be integrated in one calculating device or distributed on a network which consists of a plurality of calculating devices. Alternatively, the components and the steps of the disclosure may be realized by using the executable program code of the calculating device. Consequently, they may be stored in the storing device and executed by the calculating device, or they are made into integrated circuit component respectively, or a plurality of components or steps thereof are made into one integrated circuit entity. In this way, the disclosure is not restricted to any particular hardware and software combination.

The above description is only preferred embodiments of the disclosure and is not intended to limit the disclosure, and the disclosure may have a variety of changes and modifications for ordinary person skilled in the field. Any modification, equivalent replacement, or improvement made within the spirit and principle of the disclosure shall all fall within the protection scope of the disclosure.

What is claimed is:

1. A method for transmitting parameters, comprising:
   determining, by a transmission node, a first set of parameters, which comprises at least one antenna port number, the number of total layers, and a frequency index of a Physical Downlink Shared Channel (PDSCH) for downlink transmission, for the transmission node, wherein the first set of parameters is configured for generating at least one user equipment (UE) specific reference signal; and
   sending, by the transmission node, the first set of parameters to one or more transmission nodes adjacent to the transmission node;
   selecting, by the one or more transmission nodes, a second set of parameters, which comprises at least one antenna port number, the number of total layers, and a frequency index of a Physical Downlink Shared Channel (PDSCH) for downlink transmission, according to the first set of parameters, wherein a value corresponding to at least one of the second set of parameters is different from values corresponding to the first set of parameters;

generating, by the one or more transmission nodes, at least one UE specific reference signal corresponding to the one or more transmission nodes according to the second set of parameters.

2. The method according to claim 1, wherein the transmission node sends the first set of parameters to the one or more transmission nodes adjacent to the transmission node through an X2 interface.

3. The method according to claim 2, wherein the transmission node sends the first set of parameters to the one or more transmission nodes adjacent to the transmission node through at least one information element (IE) item on a LOAD INFORMATION message of the X2 interface.

4. The method according to claim 3, wherein determining, by a transmission node, a first set of parameters for the transmission node comprises:
   determining the first set of parameters for the transmission node by the transmission node which comprises one of the following: an evolved Node B (eNodeB), a macro cell, a relay station, a pico cell, a femtocell, a home eNodeB, a remote radio head (RRH), a radio remote unit (RRU) and a distributed antenna unit.

5. The method according to claim 2, wherein determining, by a transmission node, a first set of parameters for the transmission node comprises:
   determining the first set of parameters for the transmission node by the transmission node which comprises one of the following: an evolved Node B (eNodeB), a macro cell, a relay station, a pico cell, a femtocell, a home eNodeB, a remote radio head (RRH), a radio remote unit (RRU) and a distributed antenna unit.

6. The method according to claim 1, wherein determining, by a transmission node, a first set of parameters for the transmission node comprises:
   determining the first set of parameters for the transmission node by the transmission node which comprises one of the following: an evolved Node B (eNodeB), a macro cell, a relay station, a pico cell, a femtocell, a home eNodeB, a remote radio head (RRH), a radio remote unit (RRU) and a distributed antenna unit.

7. A method for generating parameters, comprising:
   receiving, by a transmission node, a first set of parameters, which comprises at least one antenna port number, the number of total layers, and a frequency index of a Physical Downlink Shared Channel (PDSCH) for downlink transmission, wherein the first set of parameters is sent by one or more transmission nodes adjacent to the transmission node and is used for the one or more transmission nodes to generate user equipment (UE) specific reference signals;
   selecting, by the transmission node, a second set of parameters, which comprises at least one antenna port number, the number of total layers, and a frequency index of a Physical Downlink Shared Channel (PDSCH) for downlink transmission, for generating at least one UE specific reference signal corresponding to the transmission node according to the first set of parameters; and
   using, by the transmission node, the second set of parameters to generate the at least one UE specific reference signal corresponding to the transmission node;
   wherein a value corresponding to at least one of the second set of parameters is different from values corresponding to the first set of parameters.

8. A device for transmitting parameters, wherein the device is applied to a transmission node and one or more transmission nodes, and comprise a hardware processor, configured to perform programming components stored in a memory, wherein the programming components comprise:
   a determination component, applied to the transmission node, configured to determine a first set of parameters, which comprises at least one antenna port number, the number of total layers, and a frequency index of a Physical Downlink Shared Channel (PDSCH) for downlink transmission, for a transmission node where the determination component is located, wherein the first set of parameters are used for generating at least one user equipment (UE) specific reference signal; and
   a sending component, applied to the transmission node, configured to send the first set of parameters to one or more transmission nodes adjacent to the transmission node;
   a selecting component, applied to the one or more transmission nodes, configured to select a second set of parameters, which comprises at least one antenna port number, the number of total layers, and a frequency index of a Physical Downlink Shared Channel (PDSCH) for downlink transmission, according to the first set of parameters, wherein a value corresponding to at least one of the second set of parameters is different from values corresponding to the first set of parameters;
   a generation component, applied to the one or more transmission nodes, configured to generate at least one UE specific reference signal corresponding to the one or more transmission nodes according to the second set of parameters.

9. The device according to claim 8, wherein the determination component, applied to the transmission node, configured to determine a first set of parameters for a transmission node comprises:
   the determination component, applied to the transmission node which comprises one of the following: an evolved Node B (eNodeB), a macro cell, a relay station, a pico cell, a femtocell, a home eNodeB, a remote radio head (RRH), a radio remote unit (RRU) and a distributed antenna unit, configured to determine a first set of parameters for a transmission node.

10. A device for generating parameters, wherein the device is applied to a transmission node and comprises a hardware processor, configured to perform programming components stored in a memory, wherein the programming components comprise:
   a reception component configured to receive a first set of parameters, which comprises at least one antenna port number, the number of total layers, and a frequency index of a Physical Downlink Shared Channel (PDSCH) for downlink transmission, wherein the first set of parameters are sent by one or more transmission nodes adjacent to the transmission node and is used for the one or more transmission nodes to generate user equipment (UE) specific reference signals;
   a selection component configured to select a second set of parameters, which comprises at least one antenna port number, the number of total layers, and a frequency index of a Physical Downlink Shared Channel (PDSCH) for downlink transmission, for generating at least one UE specific reference signal corresponding to the transmission node according to the first set of parameters; and
   a generation component configured to generate the at least one UE specific reference signal corresponding to the transmission node according to the second set of parameters;

wherein a value corresponding to at least one of the second set of parameters is different from values corresponding to the first set of parameters.

* * * * *